July 13, 1965 F. NESH 3,194,640

USE OF ULTRASOUND TO INDUCE CRYSTAL REARRANGEMENTS AND PHASE TRANSITIONS

Filed Feb. 10, 1961

INVENTOR
FLORENCE NESH
BY Max A. Farmer
ATTORNEY

United States Patent Office 3,194,640

Patented July 13, 1965

3,194,640

USE OF ULTRASOUND TO INDUCE CRYSTAL REARRANGEMENTS AND PHASE TRANSITIONS

Florence Nesh, 1445 Otis Place NW., Apt. 122, Washington, D.C.

Filed Feb. 10, 1961, Ser. No. 88,586
7 Claims. (Cl. 23—293)
(Granted under Title 35, U.S. Code (1952), sec. 266)

The invention described herein may be manufactured and used by or for the Government of the United States of America for governmental purposes without the payment of any royalties thereon or therefor.

This invention relates to crystal and domain rearrangements and phase transitions. One application of the invention is in the preparation of ferromagnetic materials, such as are useful in the manufacture of magnetic recording tapes. Such tapes commonly carry a thin layer of very fine particles of ferromagnetic materials bonded to a flexible base strip, with such fine particles oriented or aligned on the tape by a magnetic field before the bonding agent has fully set or hardened. Iron oxide is the ferromagnetic material presently in common use on such tapes, and the form of $\gamma Fe_2O_3$ is the particular oxide employed. The $\alpha$ form of $Fe_2O_3$ shows no ferromagnetism. The industrial methods heretofore employed to prepare $\gamma Fe_2O_3$ and $Fe_3O_4$ for magnetic tapes has not been entirely satisfactory because the particles so produced are only partially oriented due to incomplete anisotropy of the crystals and hence, are not all readily aligned on the tape. It has been found that when the oxide is preoriented on the tape, even with a saturating magnetic field, one obtains, with previously prepared ferromagnetic oxides, only about a 50% orientation or alignment of the domains, whereas if this percentage of alignment of the domains could be increased materially, such as to 100% or close to it, the sensitivity of the magnetic tape could be greatly increased.

An object of this invention is to provide an improved method of causing crystal rearrangement and phase transition in molecular structures.

Another object it to provide an improved method of converting compounds from a non-ferromagnetic state to a ferromagnetic state, and which may be easily applied to those metals having a plurality of different oxides.

A further object is to provide an improved method of preparing ferromagnetic materials for use in magnetic recording and information storing systems, which in use will provide such systems of materially increased sensitivity and accuracy over what has been heretofore possible, and maximum possible alignment of the magnetic domains on magnetic recording and information storing bodies, and which will be relatively simple, practical, rapid and inexpensive.

A further object is to provide an improved relatively simple, practical and inexpensive magnetic recording tape or body, which will have maximum possible sensitivity and accuracy for recording and storing signals and information.

Another object is to provide an improved and relatively inexpensive $\gamma Fe_2O_3$ for use on magnetic recording tape and bases, which will have maximum possible ferromagnetism, preorientation and prealignment of its domains.

Another object is to provide an improved, relatively simple method of converting $\alpha Fe_2O_3$ to $\gamma Fe_2O_3$.

Other objects and advantages will be apparent from the following description of examples of the improved method and product, which have been herein disclosed, and the novel features will be particularly pointed out in connection with the appended claims.

The invention accomplishes the desired results with a new and novely use of ultrasonic vibrations.

Figures 1, 2, 3:
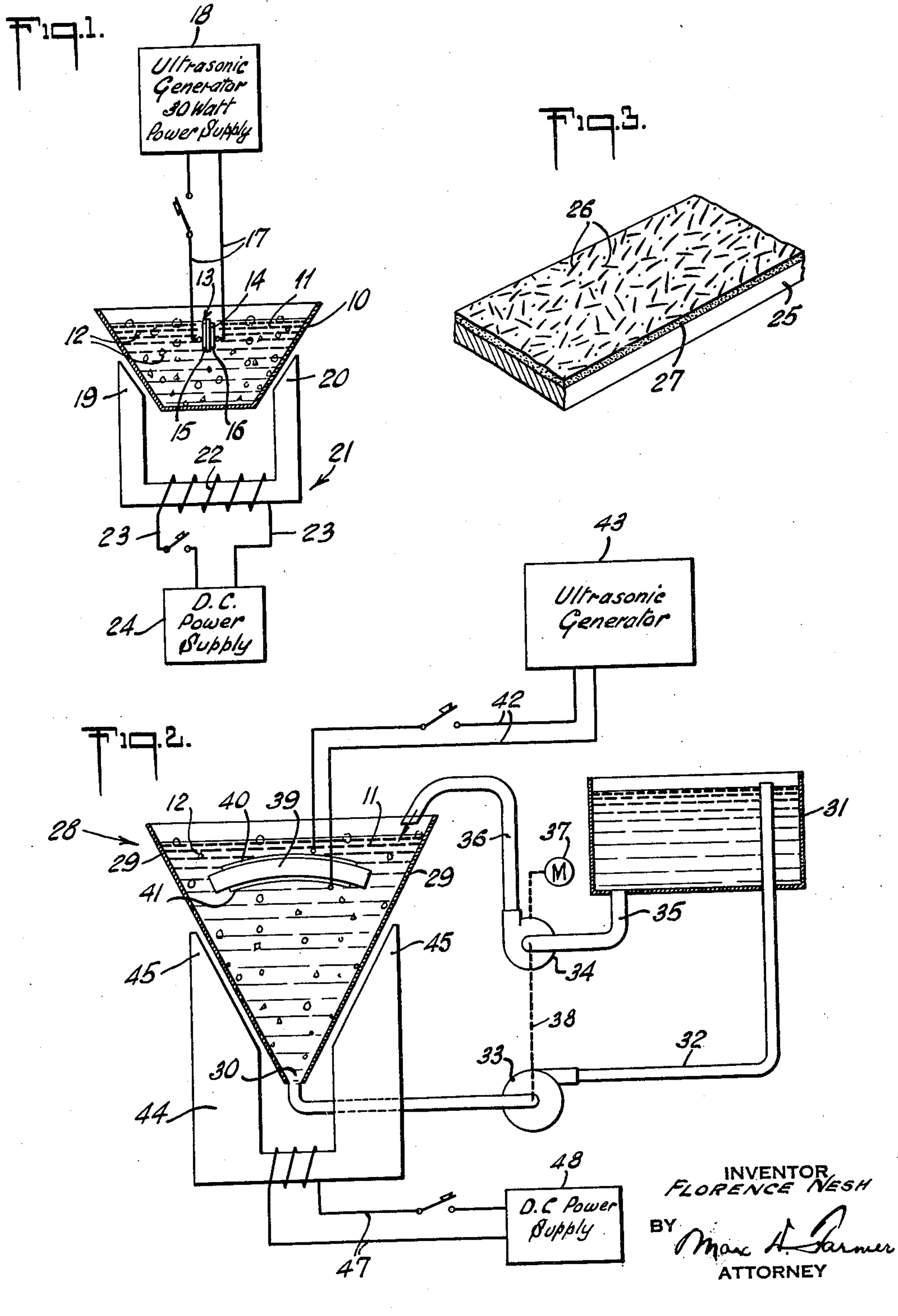
FIG. 1 is a schematic diagram illustrating one example of apparatus useful for performing the invention.
FIG. 2 is a schematic diagram illustrating another example of apparatus useful for performing the invention.
FIG. 3 is a perspective of a small piece of a magnetic tape prepared in accordance with this invention.

The $\alpha$ (alpha) $Fe_2O_3$ is non-ferromagnetic and hence, useless for use on magnetic recording tapes and bodies, whereas the $\gamma$ (gamma) $Fe_2O_3$ and $Fe_3O_4$ are ferromagnetic and useful for magnetic recordings. The $\gamma Fe_2O_3$ is the oxide in the state most commonly in current use in magnetic recording and information storage, but as heretofore prepared by reduction and then oxidation, it does not have desired properties including the desired degree of preorientation, domain alignment and crystal rearrangement. The crystal form of $\alpha Fe_2O_3$ is a corundum structure, hexagonal and close packed, whereas the crystal form of $\gamma Fe_2O_3$ is a spinel structure, cubic and close packed, and in the transformation from the alpha to the gamma form, some Fe ions must migrate from tetrahedral to octahedral positions. In such compounds the magnetic atoms are in general screened from each other by intervening non-magnetic atoms, such as oxygen in a metal oxide. Ferromagnetism can arise in such compounds only when the open lines of interaction between metal atoms are able to form a three-dimensional network as they are in the cubic $\gamma Fe_2O_3$ but not in the hexagonal $\alpha Fe_2O_3$.

A current theory is that this difference is due, in part, to the distance between adjacent atoms containing resultant electron spins. In one case, the electronic moments align in opposition to each other and the resultant magnetic moment is actually at or near zero, which is referred to as anti-ferromagnetism. It is believed that ferromagnetism occurs only when the ratio of distance (D) between neighboring atoms in a metal crystal to the radius ($r$) of the unfilled electron level is an optimum value of 3.0 or slightly greater. For iron this can be expressed as $D/r=3.26$. For manganese, as $D/r=2.94$. The manganese oxide is normally anti-ferromagnetic but may become ferromagnetic when the manganese atoms are forced slightly further apart by the introduction of hydrogen, nitrogen or other atoms into the manganese lattice. At still greater distances between the manganese atoms, the substance becomes merely paramagnetic, as do most similar transition elements and ions with increasing magnetic dilution. If no permanent magnetic dipoles are present, the substance will be diamagnetic, but if permanent magnetic dipoles are present, four possibilities arise:

(1) No interaction between the dipoles yields paramagnetism.

(2) Positive interaction between the dipoles yields ferromagnetism.

(3) Negative interaction yields anti-ferromagnetism, and (4) Simultaneous unequal positive and negative interaction yields ferromagnetism.

In going from one of the non-ferromagnetic states to a ferromagnetic state, the "spins" must be reversed and aligned, the atomic distances increased or decreased to be within certain limits, and the crystal structure changed to one which prefers a magnetic alignment. One condition, as a rule, affects the others.

Starting with $\alpha Fe_2O_3$, which is anti-ferromagnetic, and ending with the gamma form which is ferromagnetic, the change may be due to a spin realignment or increased separation of the atoms by the ultrasonic vibrations, through the cavitation produced by such vibrations in the presence of a magnetic field that prevents too great a magnetic dilution. Cavitation, as understood in hydrodynamics, is the formation of cavities in a liquid, as for instance, when a liquid tears due to under pressure, which can take place in intensive ultrasonic fields. Cavitation takes place if tension within a liquid becomes too great. The liquid tears and cavities form but collapse suddenly when subjected to outside pressure. Much force is thus released and may lead to modification of materials.

The main reason for the depolymerizing effect of ultrasonic vibrations on various substances carried in a liquid is believed to be the mechanical action of the gas bubbles which are formed by the cavitation as well as of vibrating gas bubbles in the liquid. By loading or charging the liquid with a gas, this action is greatly increased. This action by ultrasonic vibrations on a material in a gas loaded liquid in the presence of a strong magnetic field not only induces a crystal rearrangement in the molecular structure but also orients and holds the particles in oriented relation to form a magnetised system that is particularly useful in the metal oxide used to make a magnetic recording tape or body having much greater accuracy and sensitiveness than has been heretofore possible. Whether this is due to crystal rearrangement or flipping of the domains of the particles is not definitely known but it may be some of both.

In the example of apparatus for practicing the invention illustrated in FIG. 1, a container 10 is supplied with a gas loaded liquid 11 carrying finely divided particles 12 of the substance to be converted to a ferromagnetic state. Disposed in the body 11 of gas loaded liquid is a suitable source 13 of ultrasonic vibrations such as a piezoelectric element. Such an element may be a member 14 of quartz or barium titanate, or other piezoelectric material, having metallic surfaces 15 and 16 on opposite faces thereof and connected by wires 17 to a suitable ultrasonic generator 18 of signals. Disposed at opposite sides of the container 10 in close proximity to its walls are the opposite poles 19 and 20 of an electromagnet 21 whose coil or winding 22 is supplied with an energizing current through circuit wires 23 by a D.C. power supply 24. The electromagnet 21 when activated, creates a strong, continuous, one directional magnetic field in the container 10 and its contents.

In one practice of the invention, using the apparatus illustrated in FIG. 1, the ultrasonic generator 18 was of 30 watt capacity, the gas loaded liquid 11 was carbonated water, which is water into which carbon dioxide gas has been injected, and the finely divided particles 12 were dispersed particles of $\alpha Fe_2O_3$. The piezoelectric crystal was a one megacycle quartz transducer. When this transducer is activated, the $\alpha Fe_2O_3$ that was non-ferromagnetic is converted, substantially entirely, into the $\gamma Fe_2O_3$ which is ferromagnetic. The particles produced by such treatment are properly oriented so that they can readily be aligned on the tape. This pre-orientation of the ferromagnetic particles produces a product that when used on a magnetic recording tape has much greater sensitivity, accuracy and response than is possible when the $\alpha Fe_2O_3$ is converted into the ferromagnetic state of $\gamma Fe_2O_3$ by the heretofore practice of applied heat. A 250 kilocycle piezoelectric crystal may be used with a matched frequency generator or a higher frequency with high power to excite the harmonics. Excellent results are obtained when the particles are subjected to the ultrasonic vibrations and magnetic field for about 2 minutes or longer. A high power and low frequencies and high magnetic field give better results in a minimum of time.

Ultrasonic generators are well known, and hence, they have been illustrated only by block diagrams, but for the purpose of the record such generators are illustrated and described for example, in U.S. Patents #1,939,712 of December 19, 1933, #1,738,565 of December 10, 1929, and #2,163,649 of June 27, 1939. A power amplifier (not shown) may be included in the circuit, provided by wires 17, if desired, this being disclosed in U.S. Patent #1,738,565 mentioned above. A piece of a magnetic recording tape having a flexible strip 25 of sheet plastic material coated on one face with preoriented ferromagnetic particles 26 prepared according to this invention bonded to the strip by a resin layer 27 is illustrated in FIG. 3.

In the example of the apparatus illustrated in FIG. 2, which may also be used to practice this invention, a container 28, corresponding in function to container 10 of FIG. 1, has downwardly converging side walls 29 that merge into an outlet port 30. A reservoir 31, having its upper level disposed at about the upper level of container 28, is connected near its top by a pipe 32 leading to port 30 and having in it a pump 33 which when operated will withdraw a gas loaded liquid 11 with oxide particles 12 therein, from the bottom of container 28 at port 30 and deliver it to the reservoir. Another pump 34 is connected at its intake side, by pipe 35, to the bottom of the reservoir 31 and at its output side by pipe 36 to the top of container 28 for withdrawing liquid, with oxide particles therein, from reservoir 31 and delivering it to the top of container 28. These pumps thus cause a circulation of the liquid with oxide particles therein through the container 28 continuously and repeatedly. The rotors of pumps 33 and 34 are coupled together and to motor 37 by shaft 38 to insure their concomitant operation.

In the container 28 a piezoelectric element 39 is suitably mounted within the body of liquid, and its faces are provided with electrode layers 40 and 41 that are connected by wires 42 to an ultrasonic generator 43 that supplies high frequency signals or pulses to the opposite electrode layers and cause vibrations of the element 39, as usual in piezoelectric transducers. An electromagnet 44 has its pole pieces 45 disposed at and close to opposite sides of the container walls 29, below the level of the piezoelectric element 39 so as to create a strong magnetic field in the interior of the container 28 below the piezoelectric element 39. The winding 46 of the electromagnet 44 is connected by wires 47 to a D.C. source of power 48. The piezoelectric element 39, with its electroded faces 40 and 41, is concavo-convex in shape, with its concave face on its underside. The center of curvature of this concave face is preferably a short distance above the port 30, so that the ultrasonic vibrations will be focused somewhat on all of the liquid, with oxide particles carried thereby, just before it is withdrawn through port 40 for recirculation. This concentrates the ultrasonic vibrations progressively on limited portions of the circulating liquid with oxide particles, which increases the effectiveness of the action in converting the oxide or other material with the ferromagnetic state. The gas loaded liquid, with finely divided, non-ferromagnetic particles suspended or dispersed therein, when subjected to ultrasonic vibrations in the presence of the magnetic field, in both FIG. 1 and FIG. 2, will be converted into the ferromagnetic state.

While the invention has been described in detail, by way of example, in connection with the conversion of $\alpha Fe_2O_3$ into $\gamma Fe_2O_3$, it is also applicable to other materials particularly metal oxide, that can by crystal rearrangement or phase transition, be made ferromagnetic, and their domains rearranged or oriented prior to application to a base in the production of magnetic recording bodies. Among the metal oxides that can advantageously be made ferromagnetic in accordance with this invention are the iron oxides ($Fe_2O_3$), the manganese oxides ($Mn_2O_3$, $Mn_3O_4$, $MnO_2$), chromium oxides ($CrO_2$, $CrO_4$, $Cr_2O_7$, and $Cr_2O_3$) and nickel oxides ($NiO$ and $Ni_3O_4$). In addition to carbonated water, mineral oils loaded with nitrogen gas and other gas loaded liquids may be used as the liquid medium that carries the materials to be converted.

The invention is also useful for causing other crystal arrangements and domain rearrangements in various materials by providing the nuclei for extensive and intensive cavitation that modifies the materials. The use of the magntic field applied to the materials being treated, plus the gas loaded liquid, singly and together, in addition to the modifying action of ultrasonic vibrations in creating cavitation in the liquid, greatly improves the modification of the molecular structure by ultrasonic vibrations. It may happen that two components of a molecule which has been torn apart by ultrasonic vibrations, have opposite electrical charges, and then after the ultrasonic vibrations cease, are reunited due to the electrostatic forces, but an electric or magnetic field superposed on the electronic field causes the components to remain separated so that crystal rearrangement can occur. For example, ultrasonics cause a loosening of the molecular magnets in nickel rods so that demagnetization is greatly facilitated. It is also possible to influence the formation of mixed crystals by ultrasonics or to stimulate alloys, which normally crystallize heterogeneously, to form mixed crystals. Even cane sugar has been split up into monosaccharides by ultrasonics. All of these actions are accelerated by gas loaded liquids and magnetic and electric fields in accordance with this invention.

It will be understood that various changes in the materials, steps and details which have been herein described and illustrated in order to explain the nature of the invention may be made by those skilled in the art within the principle and scope of the invention as expressed in the appended claims.

I claim:

1. The method of treating a metal oxide, which in one form is non-ferromagnetic and in another form is ferromagnetic, to convert said oxide from a non-ferromagnetic form to a ferromagnetic form, which comprises:
(a) dispersing and suspending said oxide, while in a finely divided condition, in an aqueous liquid containing small gas bubbles, and
(b) subjecting said liquid with dispersed oxide suspended therein concurrently to ultrasonic vibrations sufficient to create cavitation and a strong magnetic field, until the crystal form of the oxide is changed to its ferromagnetic form.

2. The method according to claim 1, wherein said oxide in its non-ferromagnetic form is $\alpha Fe_2O_3$.

3. The method of converting a non-magnetic iron oxide to magnetic iron oxide, which comprises:
(a) dispersing and suspending said non-magnetic iron oxide in finely divided form in carbonated water, and
(b) subjecting said water, with said oxide dispersed and suspended therein, concurrently to ultrasonic vibrations sufficient to induce cavitation and a strong magnetic field until the dispersed oxide is converted into its magnetic form.

4. The method of treating a metal oxide, which in one form is non-ferromagnetic and in another form is ferromagnetic, to convert said oxide from its non-ferromagnetic form to a ferromagnetic form, which comprises:
(a) dispersing and suspending said oxide, while in a finely divided condition, in a body of aqueous liquid charged with gas, forming small discrete bubbles,
(b) creating ultrasonic vibrations of a frequency between 250 kc. and 1 mc. and of sufficient energy to induce cavitation in the interior of said liquid body with suspended and dispersed oxides, and
(c) subjecting the liquid body with said oxides suspended and dispersed therein to a strong magnetic field during said vibrations.

5. The method of treating a metal oxide, which in one form is non-ferromagnetic and in another form is ferromagnetic, to convert said oxide from its non-ferromagnetic form to a ferromagnetic form, which comprises:
(a) dispersing and suspending said oxide, while in a finely divided condition, in a body of aqueous liquid charged with gas, forming small discrete bubbles,
(b) subjecting said liquid body with said oxides dispersed and suspended therein to ultrasonic vibrations of sufficient energy to induce cavitation, and
(c) concurrently creating in said vibrating body of liquid and oxides a strong, continuous direction, magnetic field from a D.C. source of power.

6. The method of converting an iron oxide from its $\alpha Fe_2O_3$ form to a magnetic form, which comprises subjecting said oxide in its $\alpha$ form in finely divided solids concurrently to ultrasonic vibrations sufficient to induce cavitation, while disposed in a liquid, charged with gas, forming small discrete bubbles, and a strong magnetic field.

7. The method according to claim 6, wherein the gas charged liquid is carbonated water.

References Cited by the Examiner

UNITED STATES PATENTS

| | | | |
|---|---|---|---|
| 2,295,294 | 8/42 | Ross | 204—154 |
| 2,360,893 | 10/44 | Robinson | 259—1 |
| 2,407,315 | 9/46 | Mason | 204—154 |
| 2,569,468 | 10/51 | Gaugler | 148—108 |
| 2,828,231 | 3/58 | Henry | 134—1 |
| 2,876,083 | 3/59 | Prietl | 23—273 |
| 3,009,847 | 11/61 | Alles et al. | 154—53.6 |
| 3,026,215 | 3/62 | Fukuda et al. | 117—43 |

NORMAN YUDKOFF, *Primary Examiner.*

ANTHONY SCIAMANNA, MAURICE BRINDISI, *Examiners.*